Dec. 12, 1950   R. E. SLEIGHT   2,534,075
PRINTING PRESS BRAKE
Filed Sept. 29, 1949
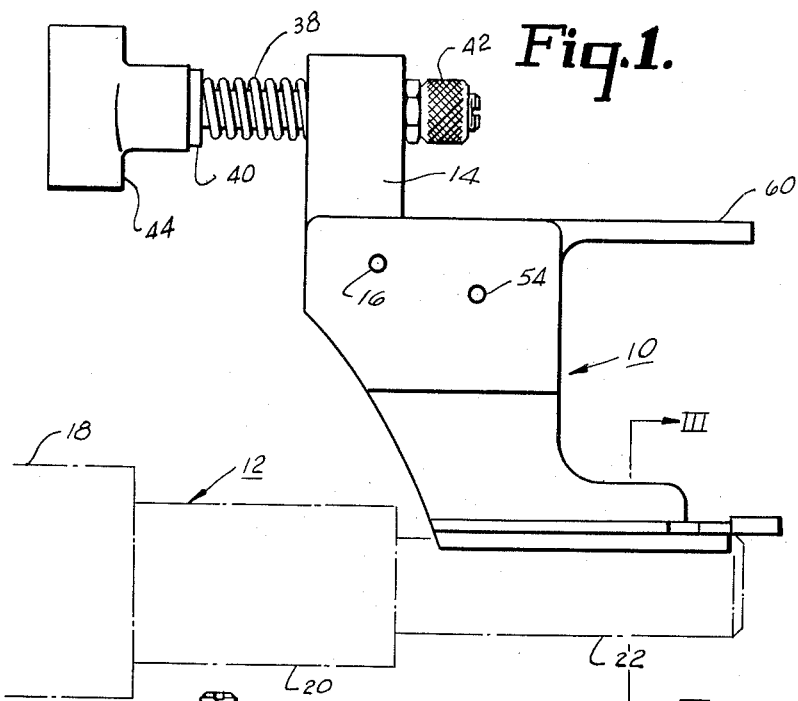
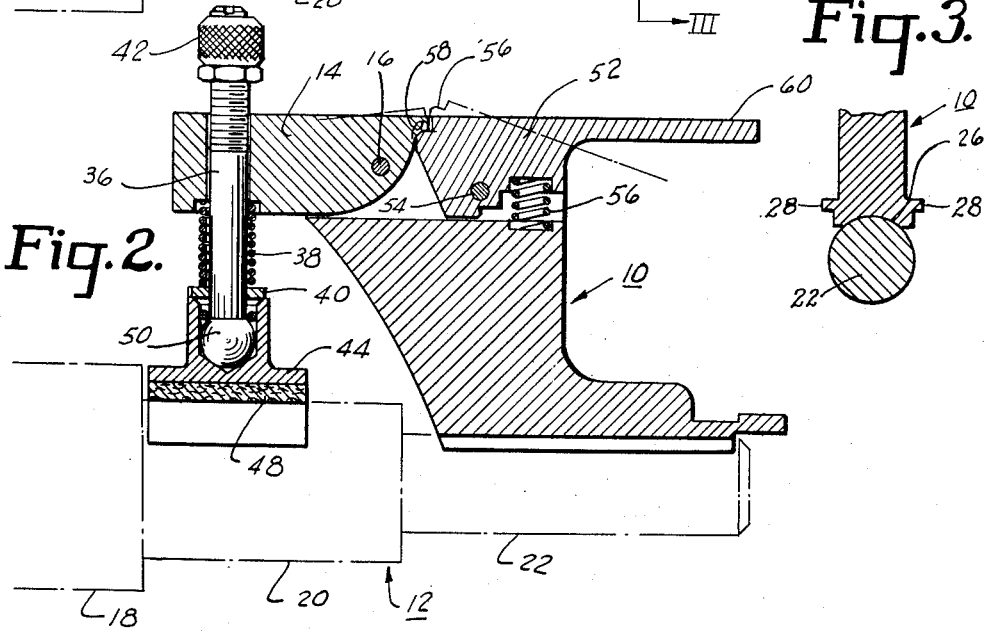
INVENTOR.
Roland E. Sleight
BY
Louis Necho
Attorney

Patented Dec. 12, 1950

2,534,075

UNITED STATES PATENT OFFICE 2,534,075

PRINTING PRESS BRAKE

Roland E. Sleight, Philadelphia, Pa.

Application September 29, 1949, Serial No. 118,549

1 Claim. (Cl. 188—83)

In printing presses of the type which employ a reciprocating flat bed and a freely rotatable ductor roll for transferring ink from the fountain roll to the bed, it is customary to use a brake for preventing, or for regulating, the rotary movement imparted to the freely rotatable ductor roll as a result of its contact with the reciprocating flat bed. The reasons for using such brake are now too well known in the art to require detailed exposition in the present application. See, for example, such patents as Miehle No. 650,853 of June 5, 1900, Dennis No. 2,178,740 of Nov. 7, 1939, and Dudley No. 2,239,168 of April 22, 1941.

The object of the invention is to produce an improved ductor roll brake of the type referred to.

The structure and advantages of the invention will be understood from the following specification and the accompanying drawings in which:

Fig. 1 is a side elevational view of a brake embodying the invention, the same being shown in its non-engaging position, certain parts being omitted.

Fig. 2 is a vertical sectional view of Fig. 1 with the brake shown in engaging position.

Fig. 3 is a section on line 3—3 on Fig. 1.

A brake embodying the invention includes a pedestal 10 adapted to be mounted adjacent one end of a ductor roll, generally referred to by the numeral 12, and a movable member 14 which is hinged to the body member at 16 and which carries means for applying pressure to the ductor roll in a manner hereinafter more fully described.

The ductor roll 12 includes a relatively soft outer padding 18 (for transferring ink from the ink roll not shown, to the reciprocating flat bed of a printing press, also not shown) and a supporting shaft 20 having a reduced end portion 22. The reduced end portion 22 of the ductor roll shaft is journalled in a support, not shown, and means, also, not shown, is provided for reciprocating the ductor roll between the ink, or fountain roll and the reciprocating flat bed of the printing press. For specific examples of the manner in which the ductor roll may be reciprocated reference may be had to the patents above mentioned.

The lower end of the body member 10 of the brake is concaved as at 26, to engage the reduced end 22 of the ductor roll shaft. The body 10 is also provided with lateral flanges 28 which are adapted to engage seats in a support, not shown.

The pressure applying mechanism includes a stem 36 which passes through a guide aperture in the hinged member 14 and which is tensioned downwardly by a spring 38 confined between the head 14 and a loose washer 40 carried by the lower end of the stem. The stem 36 is provided with an enlarged head, or nut, 42, which is too large to pass through the guide opening in the member 14, and thus limits the movement of the stem, downwardly, as viewed in the drawings, relative to the hinged member 14.

The pressure applying mechanism further includes a curved shoe 44 which is provided, on its underside, with a friction member 48 for engaging the shaft 20 as shown in Fig. 2. The shoe 44 is connected to the lower end of the stem 36 by means of a universal ball and socket joint 50, so as to be movable in all directions.

The brake illustrated also includes means for locking it in the effective position of Fig. 2, and for permitting its movement to the idle position of Fig. 1. This means includes a latch member 52 which is pivoted to the body 10 as at 54 and which is normally biased in counter-clockwise direction in Fig. 1 by means of a coil spring 56. The inner end of the latch member 54 is provided with a seat 56 adapted to be engaged by a shoulder 58 formed on adjacent edge of the pivoted member 14. The outer end of the latch member 52 is provided with a handle 60.

To mount the brake on the end of a ductor shaft, the brake in the position of Fig. 1, is presented to the right hand end of the shaft, the flanges 28 are inserted into seats 30 and the brake is moved to the left in Figs. 1 and 2 until the shoe 44 registers with the desired portion of shaft 20. The movable body 14 is then rotated in counter-clockwise direction so as to bring the parts to the position of Fig. 2 in which the shoe 48 engages the shaft 20 with a pressure determined by the spring 38. Because the shoulder 58 of the body 14 rests on seat 56 in latch member 50 and because the portion of the latch member to the left of pivot 54 in Fig. 2 rests on or is very close to the pedestal 10, the movable body 14 cannot be moved in clockwise direction as long as the parts are in the position of Fig. 2. This provides a positive lock and insures against the brake moving to the position of Fig. 1 in response to vibrations and impacts which are incidental to the operation of the press.

In order to move the stem 38 and shoe 44 to the position of Fig. 1, the handle 60 is depressed against the action of spring 56. This results in clockwise rotation of the latch member 52 and in counter-clockwise rotation of movable member 14 until the inner edge of seat 56 clears the underside of the adjacent edge of the shoulder 58, as shown in broken lines in Fig. 2. The body 14 can now be rotated, in clockwise direction, from the position of Fig. 1 to that of Fig. 2. It will be understood that, when the brake is in the position of Fig. 2, the spring 38 is not wholly compressed so that it can yield enough to permit the counter-clockwise rotation of the body 14 which is required to permit disengagement of shoulder 58 from seat 56. To bring the parts back to the position of Fig. 1, the latch member 52 is rotated in counter-clockwise direction simultaneously with the rotation of the body member 14 in clockwise direction until the shoulder 58 again engages the seat 56.

What I claim is:

A brake for a printing press of the type which includes a shaft, and a ductor roll carried by said shaft, said brake including a pedestal detachably journalled on said shaft in proximity to said ductor roll, a first body member pivoted to the inner portion of said pedestal and having a guide opening in the inner portion thereof, a stem having a limited sliding movement in said guide opening, a brake shoe, a universal joint securing said shoe to said stem, said first body member being movable to a first position in which said stem is normal to the axis of rotation of said shaft and said shoe contacts said ductor roll and to a second position in which said stem forms an obtuse angle with the axis of said shaft and said shoe is out of engagement with the ductor roll, a spring carried by said stem and confined between said first body member and said shoe for biasing said shoe against said shaft when said first body member is in said first position, a shoulder formed on the outer edge of said first body member, a second body member pivoted to the outer portion of said pedestal adjacent said first body member, there being a seat formed in the inner edge of said second body member adapted to be engaged by said shoulder, said second body member being movable to a first position in which said shoulder engages said seat and said first body member is locked in its first position, and to a second position in which said shoulder is disengaged from said seat and said first body member can be moved to its second position; and a spring between the outer portion of said second body member and said pedestal for biasing said second member to its first position.

ROLAND E. SLEIGHT.

REFERENCES CITED

The following references are of record in the file of this patent:

UNITED STATES PATENTS

| Number | Name | Date |
| --- | --- | --- |
| 586,745 | Pierce et al. | July 20, 1897 |
| 1,619,805 | Bailey | Mar. 8, 1927 |
| 2,239,168 | Dudley | Apr. 22, 1941 |